United States Patent
Lewis et al.

(10) Patent No.: US 7,571,131 B1
(45) Date of Patent: Aug. 4, 2009

(54) METHOD OF CONDUCTING ONLINE COMPETITIVE PRICE QUOTING EVENTS

(75) Inventors: Julie A. Lewis, Livonia, MI (US); Brian M. Toothman, Redford, MI (US); Rahmon Gharajanloo, Novi, MI (US); Roxana P. Molina, Canton, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/532,833

(22) Filed: Mar. 21, 2000

Related U.S. Application Data

(60) Provisional application No. 60/163,755, filed on Nov. 5, 1999.

(51) Int. Cl.
*G06Q 40/00* (2006.01)
(52) U.S. Cl. .................................................. 705/37
(58) Field of Classification Search ............. 705/35–45, 705/26–27
See application file for complete search history.

(56) References Cited

U.S. PATENT DOCUMENTS

| | | | |
|---|---|---|---|
| 5,757,917 A | 5/1998 | Rose et al. ................. 380/25 |
| 5,765,139 A | 6/1998 | Bondy ............................ 705/8 |
| 5,774,873 A | 6/1998 | Berent et al. | |
| 5,794,207 A * | 8/1998 | Walker et al. ................. 705/26 |
| 5,794,219 A | 8/1998 | Brown | |
| 5,802,497 A | 9/1998 | Manasse ....................... 705/27 |
| 5,809,479 A | 9/1998 | Martin et al. ................. 705/11 |
| 5,826,241 A | 10/1998 | Stein et al. ..................... 705/26 |
| 5,835,896 A * | 11/1998 | Fisher et al. .................. 705/37 |
| 5,839,112 A | 11/1998 | Schreitmueller et al. ....... 705/4 |
| 5,884,300 A | 3/1999 | Brockman ..................... 707/2 |
| 5,887,271 A | 3/1999 | Powell ......................... 705/14 |
| 5,890,137 A | 3/1999 | Koreeda ....................... 705/26 |
| 5,890,138 A | 3/1999 | Godin et al. | |
| 5,895,454 A | 4/1999 | Harrington ................... 705/26 |
| 5,897,621 A * | 4/1999 | Boesch et al. ................. 705/26 |
| 5,897,622 A | 4/1999 | Blinn et al. ................... 705/26 |

(Continued)

OTHER PUBLICATIONS

Bates, Daniel. "When the Corporate Giant Doesn't Want Your Innovation" Small Business News : Pittsburgh. Pittsburgh: Jun. 1, 1997. vol. 4, Iss. 2; p. 8.*

(Continued)

*Primary Examiner*—James A. Kramer
*Assistant Examiner*—Jason Borlinghaus
(74) *Attorney, Agent, or Firm*—Gary Smith; Brooks Kushman P.C.

(57) ABSTRACT

A method of conducting an online competitive price quoting event for at least one commodity includes storing event, commodity data, supplier data, historical data, a default currency, and a preferred currency into the at least one data table. An event token, which grants access authorization to agents representing the plurality of suppliers, is assigned to the event and is provided to the suppliers. A bid entry screen is displayed to the agents. An actual bid from the agent is compared to the current winning bid and a current minimum bid. A minimum bid from the agent is compared to the current winning bid and a current minimum bid. A current winner and a current winning bid are then determined. The bid entry screen is updated with the current winning bid, and each entry is color coded to reflect the current status of the agent's bids.

48 Claims, 9 Drawing Sheets

U.S. PATENT DOCUMENTS

| | | | |
|---|---|---|---|
| 5,899,980 A | 5/1999 | Wilf et al. ........................ | 705/26 |
| 5,905,974 A | 5/1999 | Fraser et al. | |
| 5,905,975 A | 5/1999 | Ausubel | |
| 5,913,210 A | 6/1999 | Call ................................. | 707/4 |
| 5,950,173 A | 9/1999 | Perkowski ..................... | 705/26 |
| 5,960,408 A | 9/1999 | Martin et al. .................. | 705/11 |
| 5,960,411 A | 9/1999 | Hartman et al. ............... | 705/26 |
| 5,970,472 A | 10/1999 | Allsop et al. .................... | 705/26 |
| 5,970,475 A | 10/1999 | Barnes et al. | |
| 5,983,199 A | 11/1999 | Kaneko .......................... | 705/26 |
| 5,991,739 A | 11/1999 | Cupps et al. ................... | 705/26 |
| 6,009,413 A | 12/1999 | Webber et al. ................. | 705/26 |
| 6,012,045 A | 1/2000 | Barzilai et al. | |
| 6,014,628 A | 1/2000 | Kovarik, Jr. ...................... | 705/1 |
| 6,014,644 A * | 1/2000 | Erickson ........................ | 705/37 |
| 6,016,504 A | 1/2000 | Arnold et al. ................. | 709/200 |
| 6,058,379 A * | 5/2000 | Odom et al. .................... | 705/37 |
| 6,192,131 B1 * | 2/2001 | Geer et al. ................... | 380/283 |
| 6,260,024 B1 * | 7/2001 | Shkedy .......................... | 705/37 |
| 6,272,474 B1 * | 8/2001 | Garcia ........................... | 705/37 |
| 6,282,521 B1 * | 8/2001 | Howorka ...................... | 705/37 |
| 6,421,653 B1 * | 7/2002 | May .............................. | 705/37 |
| 6,549,904 B1 * | 4/2003 | Ortega et al. ................... | 705/37 |
| 6,564,192 B1 * | 5/2003 | Kinney et al. .................. | 705/37 |
| 6,647,373 B1 * | 11/2003 | Carlton-Foss ................. | 705/37 |
| 6,886,000 B1 * | 4/2005 | Aggarwal et al. ............. | 705/80 |

OTHER PUBLICATIONS

Ken Brack. Industrial Distribution. "GM Buying Into Online Auctions" New York: Nov. 1998. vol. 87, Iss. 11; p. 21, 2 pgs.*

Clinton Wilder. "State Makes a Bid" InformationWeek. Manhasset: Feb. 15, 1999. , Iss. 721; p. 123, 1 pgs.*

Jason Busch. "Wanted: Better Auctions", InformationWeek. Manhasset: Mar. 22, 1999., Iss. 726; p. 164, 1 pgs.*

Gregory Dalton. "Going, Going, Gone!" InformationWeek. Manhasset: Oct. 4, 1999., Iss. 755; p. 44, 5 pgs.*

William J. Holstein. A Tip Sheet for Car Shopping Online the Cyberdealers U.S. News & World Report. Washington: Oct. 25, 1999.vol. 127, Iss. 16; p. 46.*

Neal E. Boudette. , "In Europe, Surfing a Web of Red Tape—Even on Internet, Ancient Rules Inflate Prices, Block Path to Borderless Commerce" Wall Street Journal. (Eastern edition). New York, N.Y.: Oct. 29, 1999. p. B.1.*

PR Newswire. Ford and Oracle to Create Multi-Billion-Dollar Business-to-Business Internet Ventur New York: Nov. 2, 1999. p. 1.*

Kehoe, Louise, Tait, Nikki. Ford to set up internet supply chain: Link with Oracle aims to handle $200bn in deals annually; [London edition]Financial Times. London (UK): Nov. 3, 1999. p. 01.*

Jeffrey Ball and Gregory L. White in Las Vegas, and Lee Gomes in San Francisco. "Ford and GM to Put Supply Operations Online in Rival E-Commerce Ventures" Wall Street Journal. (Eastern edition). New York, N.Y.: Nov. 3, 1999. p. A.4.*

Kent, Allen & Williams, James G. Encyclopedia of Microcomputers. vol. 19. Marcel Dekker Inc. New York, NY. 1997. p. 398.*

Roger, Jean-Yves; Stanford-Smith, Brian; Kidd, Paul T. Technologies for the Information Society: Developments and Opportunities. IOS Press. Amsterdam, Netherlands. 1998. pp. 397-399.*

Card, Stuart K; Mackinlay, Jock D; Shneiderman, Ben. Readings in Information Visualization Using Vision To Think. Morgan Kaufmann Publishers. San Francisco, CA. Jan. 25, 1999. pp. 17-23.*

Foley; van Dam; Feiner; Hughes. Computer Graphics: Principles & Practice. 2nd Edition. Addison-Wesley Publishing Company. Jul. 1997. p. 602), Kent (Kent, Allen & Williams, James G. Encyclopedia of Microcomputers. vol. 19. Marcel Dekker Inc. New York, NY. 1997. p. 398.*

AT Kearney, *Creating Supply Advantage*[SM], Computer-Aided Sourcing System, CAS[3] Auction Discussion At Ford, Mar. 19, 1999.

Freemarkets Online®, Online Industrial Market Making Brochure, Undated, pp. 1-12.

Timothy Aeppel, *Bidding for E-Nuts and E-Bolts On the Net*, Reprinted from The Wall Street Journal, Mar. 12, 1999.

Glen Meakem, *How Bazaar*, CIO WebBusiness, Section Two, Aug. 1, 1998.

FreeMarkets, *Publicity*, <http://www.freemarkets.com/scripts/publicity.asp>, last visited Jul. 29, 1999 @ 3:55 PM.

*The $300 Billion Stealth Economy*, Inc. Technology 1998, No. 3, Reprinted with permission of Inc. magazine. Copyright © 1998, Goldhirsh Group, Inc.

Scott Woolley, *E-muscle*, Technology Web Solver, Undated, Reprinted by Permission of FORBES Magazine—Mar. 9, 1998 Issue © 1998 FORBES Inc.

Clinton Wilder, *Electronic Purchasing—What's Your Bid*, Informationweek, Nov. 10, 1997.

Robert D. Hof, 'The Buyer Always Wins', *Business Week*, Undated, Reprinted from Business Week, Mar. 22, 1999 copyright by The McGraw-Hill Companies, Inc. with all rights reserved.

uBid.com *Help Pages*, <wysiwyg://8/http://www.ubid.com/help/auctions.asp>, last visited Jan. 19, 2000 @10:22 AM.

*BuyGroup.com*, <http://ag.buygroup.com/>, last visited Feb. 7, 2000 @ 9:44 AM.

*cattleofferings.com*, <http://www.CattleOfferings.com/>, last visited Feb. 7, 2000 @ 9:42 AM.

*Marex.com*, <http://www.marex.com/about/about.asp>, last visited Feb. 7, 2000 @ 9:40 AM.

*FastParts.com*, <http://webt1.sanjose.fastparts.com/>, last visited Feb. 7, 2000 @ 9:37 AM.

*MetalSite: Global Metals Marketplace*, <http://www.MetalSite.com/>, last visited Feb. 7, 2000 @ 9:35 AM.

*Chemdex Accelerating Science*, <wysiwyg://36/http://www.Chemdex.com/about_chemdex/index.html>, last visited Feb. 7, 2000 @ 9:31 AM.

*eBay—Your Personal Trading Company*, <wysiwyg://19/http://www.ebay.com/index.html>, last visited Feb. 7, 2000 @2:21 PM.

U.S. Appl. No. 09/561,644 entitled *Method and System for Configuring and Ordering Consumer Product*, filed May 2, 2000, 31 pages.

U.S. Appl. No. 09/538,516 entitled *Communication Schema of Online System and Method of Status Inquiry and Tracking Related to Orders for Consumer Product Having Specific Configurations*, filed Mar. 29, 2000, 122 pages.

U.S. Appl. No. 09/537,190 entitled *Online System and Method of Status Inquiry and Tracking Related to Orders for Consumer Product Having Specific Configurations*, filed Mar. 29, 2000, 118 pages.

U.S. Appl. No. 09/539,392 entitled *Online System and Method of Locating Consumer Product Having Specific Configurations in the Enterprise Production Pipeline and Inventory*, filed Mar. 31, 2000, 120 pages.

U.S. Appl. No. 09/542,413 entitled *Online System and Method of Reporting Related to Orders for Consumer Product Having Specific Configurations*, filed Apr. 1, 2000, 119 pages.

U.S. Appl. No. 09/542,637 entitled *Communication Schema of Online System and Method of Ordering Consumer Product Having Specific Configurations*, filed Apr. 4, 2000, 122 pages.

U.S. Appl. No. 09/543,833 entitled *Communication Schema of Online Reporting System and Method Related to Online Orders for Consumer Products Having Specific Configurations*, filed Apr. 5, 2000, 118 pages.

U.S. Appl. No. 09/543,686 entitled *Online System and Method of Ordering and Specifying Consumer Product Having Specific Configurations*, Apr. 5, 2000, 119 pages.

U.S. Appl. No. 09/543,860 entitled *Communication Schema of Online System and Method of Locating Consumer Product in the Enterprise Production Pipeline*, filed Apr. 5, 2000, 135 pages.

MSN CarPoint web page at http://carpoint.msn.com/newcar/default.asp?src=home New-Car buying service, © 2000, 5 pages.

autobytel.com web page at http://www.autobytel.com/content/buy/NewIndex.cfn?id=abt New Car Purchase Center, date unknown, 6 pages.

Ford Motor Company web page at http://www.ford.com/default.asp?pageid=114 Buyer Connection Build a New Vehicle, date unknown, 10 pages.

GM BuyPower web page at wysiwyg://45/http://www.gmbuypower.applications.Session.Driver the Gmexperiencelive, date unknown, copyright 1999, *General Motors Corporation*, 11 pages, 1999.

Gateway.com web page at http://www.gateway.com/home/index.shtml Choose Accessory Store, copyright 1997, 1998, 1999, 2000 *Gateway, Inc.*, 11 pages, 1997-2000.

* cited by examiner

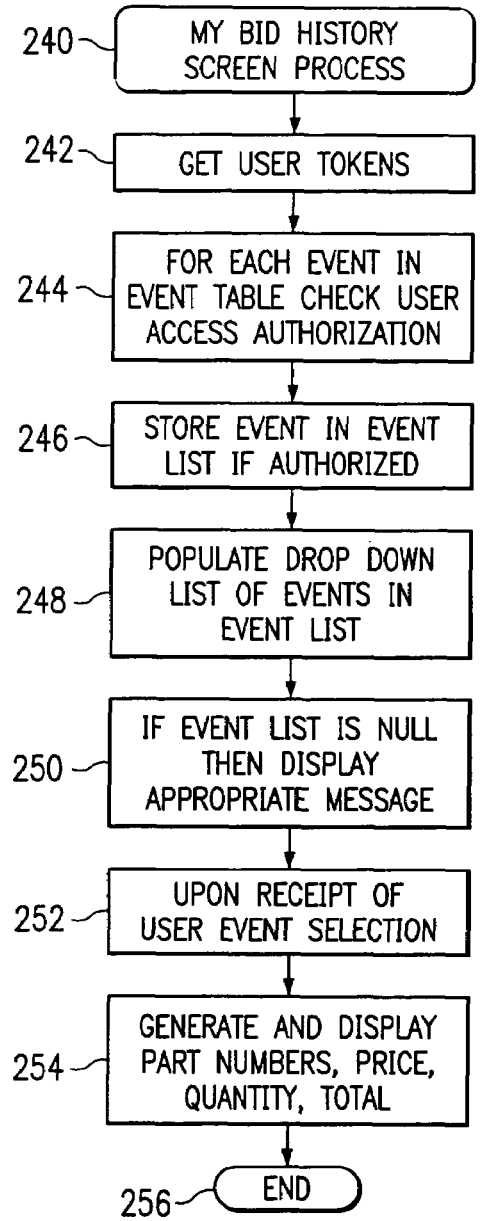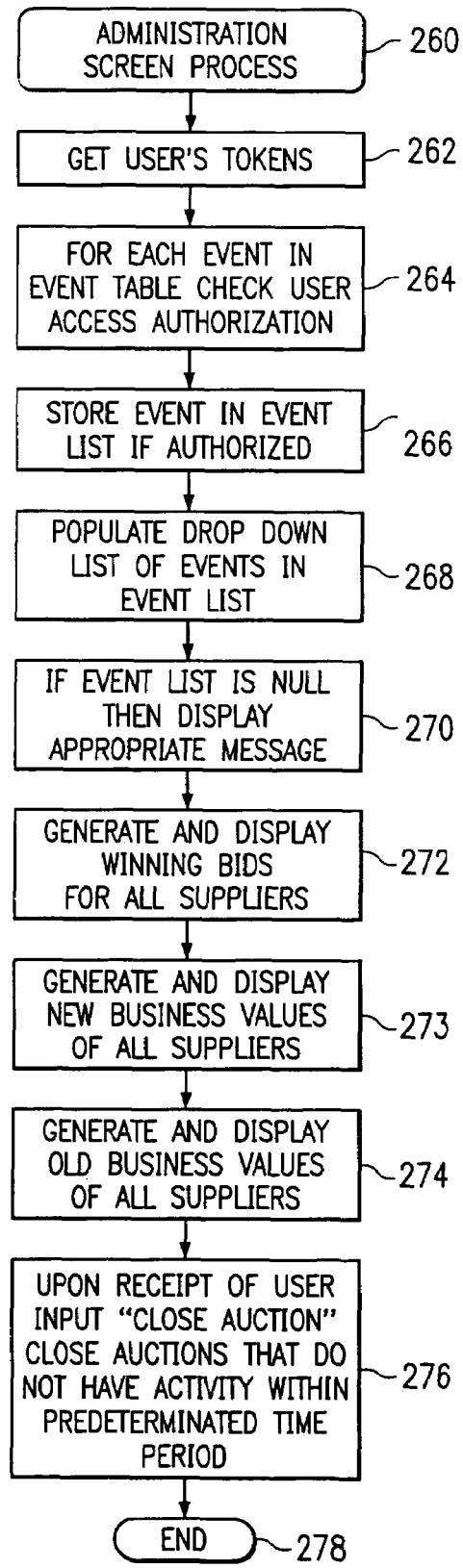

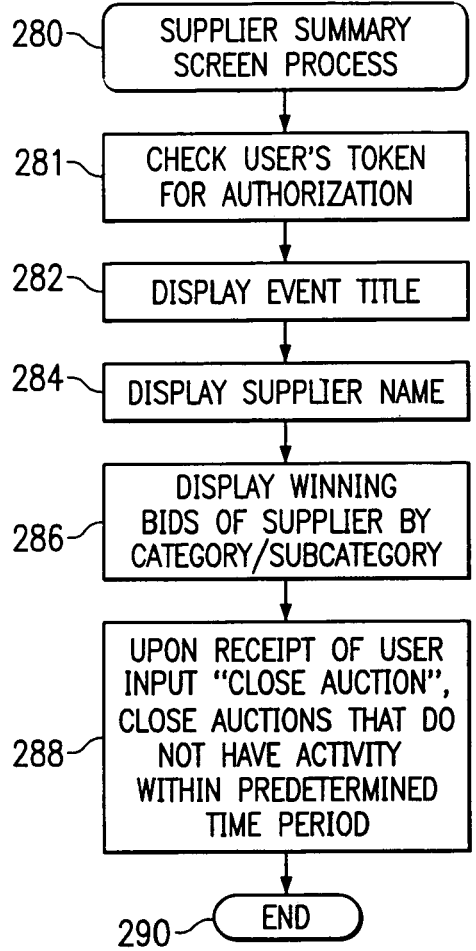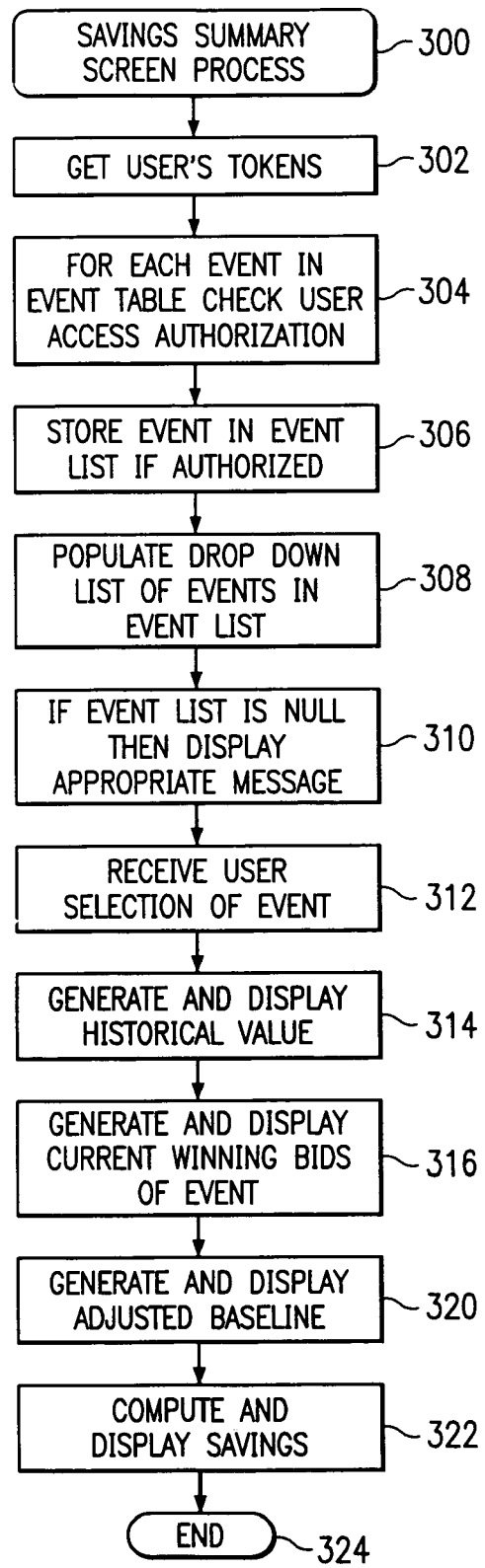

METHOD OF CONDUCTING ONLINE COMPETITIVE PRICE QUOTING EVENTS

RELATED PATENT APPLICATION

This application claims the benefit of provisional application No. 60/163,755, entitled Automotive Internet Business Methods and Systems, filed on Nov. 5, 1999.

TECHNICAL FIELD OF THE INVENTION

This invention is related in general to the field of computer systems and the Internet. More particularly, the invention is related to method of conducting online competitive price quoting events.

BACKGROUND OF THE INVENTION

A business enterprise is often required to purchase or source materials and supplies from suppliers. In order to obtain reasonable prices on the purchases, the business enterprise may request a number of suppliers to submit bids or price quotes on a given amount and specific type of materials and supplies. The suppliers then respond to the request by providing a price for the materials and supplies. The business enterprise purchasing agent is then required to analyze the quoted prices from all the suppliers. Armed with the price quotes, the purchasing agent can negotiate the price further and narrow the supplier field. This negotiation process may be necessary for many iterations over many weeks. Various industry surveys reveal that the cost of processing a requisition and a purchase order can range from $25 to $300 per purchase order. Therefore, large overhead is associated with the procurement process of a corporation that can cost tens of thousands of dollars or more.

SUMMARY OF THE INVENTION

The Internet and the World Wide Web have proven to be not only a conduit of data and communication between individuals but also a conduit between business enterprises. Business organizations are racing to learn to use the Internet as a tool to do business with other business organizations. Online communication enabled by the Internet and the content-rich World Wide Web have enabled businesses to speed up their business processes. The present invention is directed to an online system and process for conducting online competitive price quoting events, which not only speeds up the price negotiation process, but also enable the suppliers to more clearly appreciate where they stand with respect to their competition. The present invention allows a supplier to submit a minimum bid and an actual bid. The method of the present invention automatically lowers the actual bid of the supplier under certain predetermined conditions until the supplier's minimum bid is reached. In this way, the supplier does not have to continuously monitor the bidding activity and enter new bids to stay competitive.

In accordance with the present invention, a method of receiving online competitive supplier price quotes are provided which eliminates or substantially reduces the disadvantages associated with prior systems and processes.

In one aspect of the invention, a method of conducting an online competitive price quoting event for at least one commodity includes the steps of storing event data associated with the event into at least one data table, storing commodity data associated with the at least one commodity into the at least one data table, storing supplier data associated with a plurality of suppliers who will participate in the event into the at least one data table, storing historical data associated with past transactions related to the at least one commodity of the plurality of suppliers, storing a default currency for the event into the at least one data table, and storing a preferred currency for each of the plurality of suppliers into the at least one data table. The method further assigns an event token to the event and provides the event token to the suppliers, and grants access authorization to agents representing the plurality of suppliers in response to receiving the event token for the event. A bid entry screen is displayed to the agents which lists the at least one commodity as at least one entry, its current winning bid in the preferred currencies of the suppliers, its target price in the preferred currencies of the suppliers, status of the agents' bids, and entry fields for receiving an actual bid and a minimum bid. The method further compares an actual bid to the current winning bid and a current minimum bid in response to receiving the actual bid from an agent, the actual bid representing the price at which the supplier is willing to sell the at least one commodity. The method also compares a minimum bid to the current winning bid and a current minimum bid in response to receiving the minimum bid from an agent, the minimum bid representing the lowest price the supplier is willing to sell the at least one commodity. A current winner and a current winning bid are then determined. The bid entry screen is updated with the current winning bid, and each entry is color coded to reflect the current status of the agent's bids.

In another aspect of the invention, a method of conducting an online competitive price quoting event for at least one commodity includes the steps of storing event data associated with the event into at least one data table, storing commodity data associated with the at least one commodity into the at least one data table, storing supplier data associated with a plurality of suppliers who will participate in the event into the at least one data table, storing historical data associated with past transactions related to the at least one commodity of the plurality of suppliers, storing a default currency for the event into the at least one data table, and storing a preferred currency for each of the plurality of suppliers into the at least one data table. The method provides an event token to the suppliers, and grants access authorization to agents representing the plurality of suppliers in response to receiving the event token for the event. A bid entry web page is transmitted to the agents over the Internet, where the bid entry web page lists the at least one commodity as at least one entry, its current winning bid in the preferred currencies of the suppliers, its target price in the preferred currencies of the suppliers, status of the agents' bids, and entry fields for receiving an actual bid and a minimum bid. The method compares an actual bid to the current winning bid and a current minimum bid in response to receiving the actual bid from an agent and transmitted over the Internet, the actual bid representing the price at which the supplier is willing to sell the at least one commodity. The method also compares a minimum bid to the current winning bid and a current minimum bid in response to receiving the minimum bid from an agent, the minimum bid representing the lowest price the supplier is willing to sell the at least one commodity. A current winner and a current winning bid are determined.

In yet another aspect of the invention, a method of conducting an online competitive price quoting event for at least one commodity is provided. The method includes the steps of storing event data associated with the event into at least one data table, storing commodity data associated with the at least one commodity into the at least one data table, storing supplier data associated with a plurality of suppliers who will participate in the event into the at least one data table, and storing historical data associated with past transactions related to the at least one commodity of the plurality of suppliers. The method further provides the steps of providing an event token to the suppliers, granting access authorization to agents representing the plurality of suppliers in response to receiving the event token for the event, and transmitting a bid entry web page to the agents over the Internet. The bid entry web page lists the at least one commodity as at least one entry, its current winning bid in the preferred currencies of the suppliers, its target price in the preferred currencies of the suppliers, status of the agents' bids, and entry fields for receiving an actual bid and a minimum bid. An actual bid submitted by an agent of a supplier is compared to the current winning bid and a current minimum bid, where the actual bid represents the price at which the supplier is willing to sell the at least one commodity. A minimum bid submitted by the agent is also compared to the current winning bid and a current minimum bid, where the minimum bid represents the lowest price the supplier is willing to sell the at least one commodity. A current winner and a current winning bid are then determined. The bid entry web page is then updated with the current winning bid, where the at least one entry on the bid entry web page is color coded to reflect the current status of the agent's bids.

BRIEF DESCRIPTION OF THE DRAWINGS

For a better understanding of the present invention, reference may be made to the accompanying drawings, in which:

FIG. 8 is a flowchart of an embodiment of a my bid history screen process constructed according to the teachings of the present invention;

FIG. 9 is a flowchart of an embodiment of a supplier summary screen process constructed according to the teachings of the present invention; and FIG. 10 is a flowchart of an embodiment of an event supplier summary screen process constructed according to the teachings of the present invention.

FIG. 11 is a flowchart of an embodiment of a savings summary screen process constructed according to the teachings of the present invention.

DETAILED DESCRIPTION OF THE INVENTION

Figure 1:
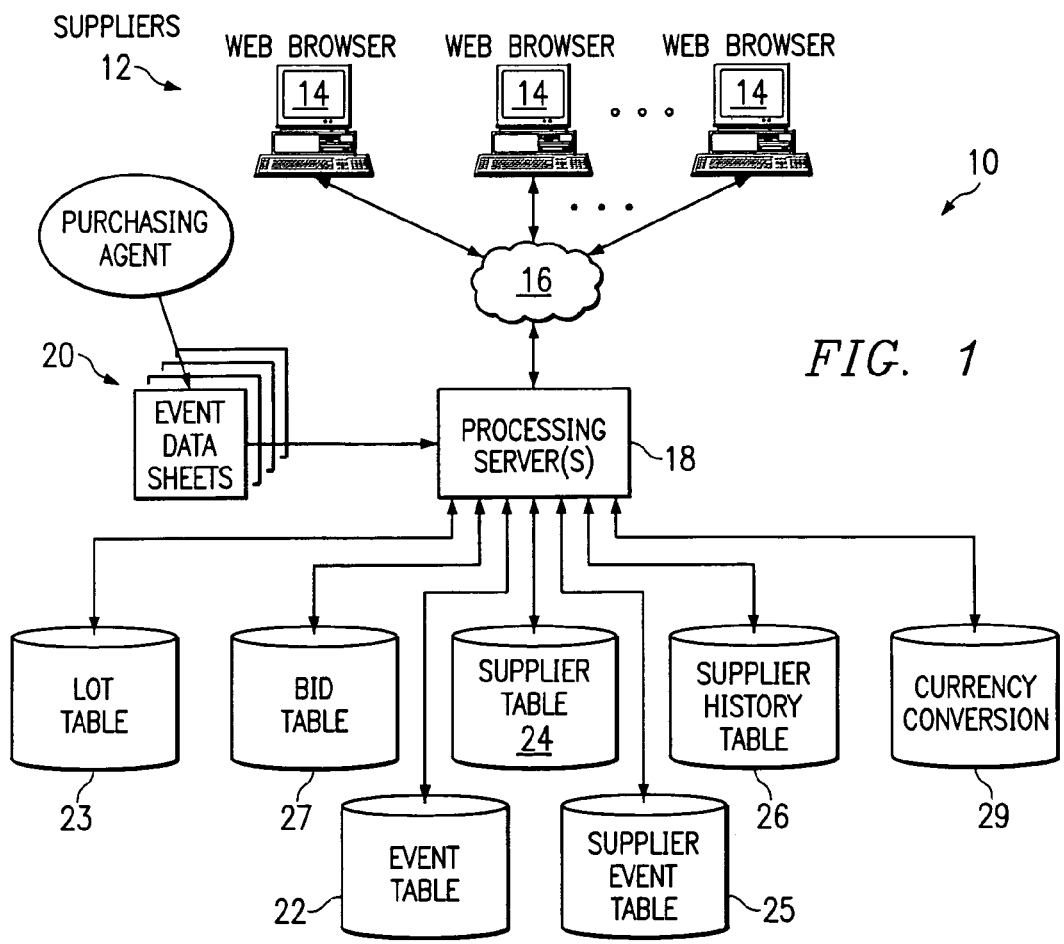
FIG. 1 is a top-level functional block diagram of an embodiment of a system of receiving online competitive supplier price quotes constructed according to the teachings of the present invention.

FIG. 1 is a top-level functional block diagram of an embodiment of a system of receiving online competitive supplier price quotes 10 constructed according to the teachings of the present invention. System 10 is used to allow a plurality of suppliers 12 to submit online competitive price quotes or bids solicited by a business enterprise. Suppliers 12 use computers or computing devices 14 connectable to a communications network or the Internet 16. Suppliers 12 may use a user interface such as a web browser application to display and enter data contained in files commonly called web pages. The data or the web pages are stored and maintained on one or more processing servers 18 associated with the business enterprise soliciting the competitive bids. A purchasing agent provides specific data related to the bidding event to processing server(s) 18. The purchasing agent may provide event data by completing event data sheets or electronic worksheets 20 and submitting the completed worksheets to processing servers 18. An event is defined as a set of online transactions in which a number of selected suppliers submit online bids or price quotes for specific materials or services defined by the business enterprise. The starting and end time for the event is typically preset and the closing of the event may depend on bidding activity. For example, if at the event end time, a price quote was received within the last thirty minutes for a particular lot, the bidding period for that lot continues until there has been a thirty-minute period of inactivity.

A number of relational data tables, data files, or databases may be used by processing servers 18 to store data related to events, suppliers, and bids, etc. For example, an event table 22 may be used to store information about events, such as a unique event identifier, an event name, the currency specified for the event, a security access token assigned to the event, an event start date/time, an event end date/time, and date/time when the event ends.

A lot table 23 may be used to store information related to the lots of commodities for which price quotes are being solicited. Lot information may include a unique lot identifier, a unique identifier of the event in which the lot is the subject of the quoting activity, a quantity for the number of items in the lot, an identification of what material/supplies is being quoted on, the starting bid or the present lowest bid amount, the minimum bid amount of the supplier who submitted the present lowest bid, and the target price set by the business enterprise.

A supplier table 24 may be used to store information related to the suppliers. Supplier information may include a unique supplier identifier, a supplier name, the supplier's representative identifiers or user IDs, and a default currency the supplier will use to submit quotes. A supplier event table 25 may be used to store information related to the suppliers' activities with respect to specific events, such as the supplier's unique identifier, the unique identifier of the event, and the amount quoted by the supplier for a given event across all lots/items. A supplier history table 26 may be used to store information related to past business conducted between the supplier and the business enterprise, such as the supplier identifier, the item identifier, the item name, the item part number (if applicable), the item price, and the quantity of the item supplied by the supplier.

A bid table 27 may be used to store information related to the bids or quotes submitted by the suppliers, such as a unique identifier of the bid, the lot identifier, the identifier of the supplier who submitted the quote, the identifier of the supplier representative who submitted the quote, the actual bid amount, the minimum bid amount, a flag indicative of whether the actual bid was made manually by the supplier representative or by the system automatically, and the date and time the actual bid was entered.

A currency conversion table 29 may be used to store information about converting from one currency to another currency. The conversion data in this table may be updated daily or as frequently as necessary when there are large fluctuations. The currency conversion data in this table is used to automatically convert the suppliers' price quote submitted in its default currency into the default currency of the business enterprise and vice versa.

Figure 2:
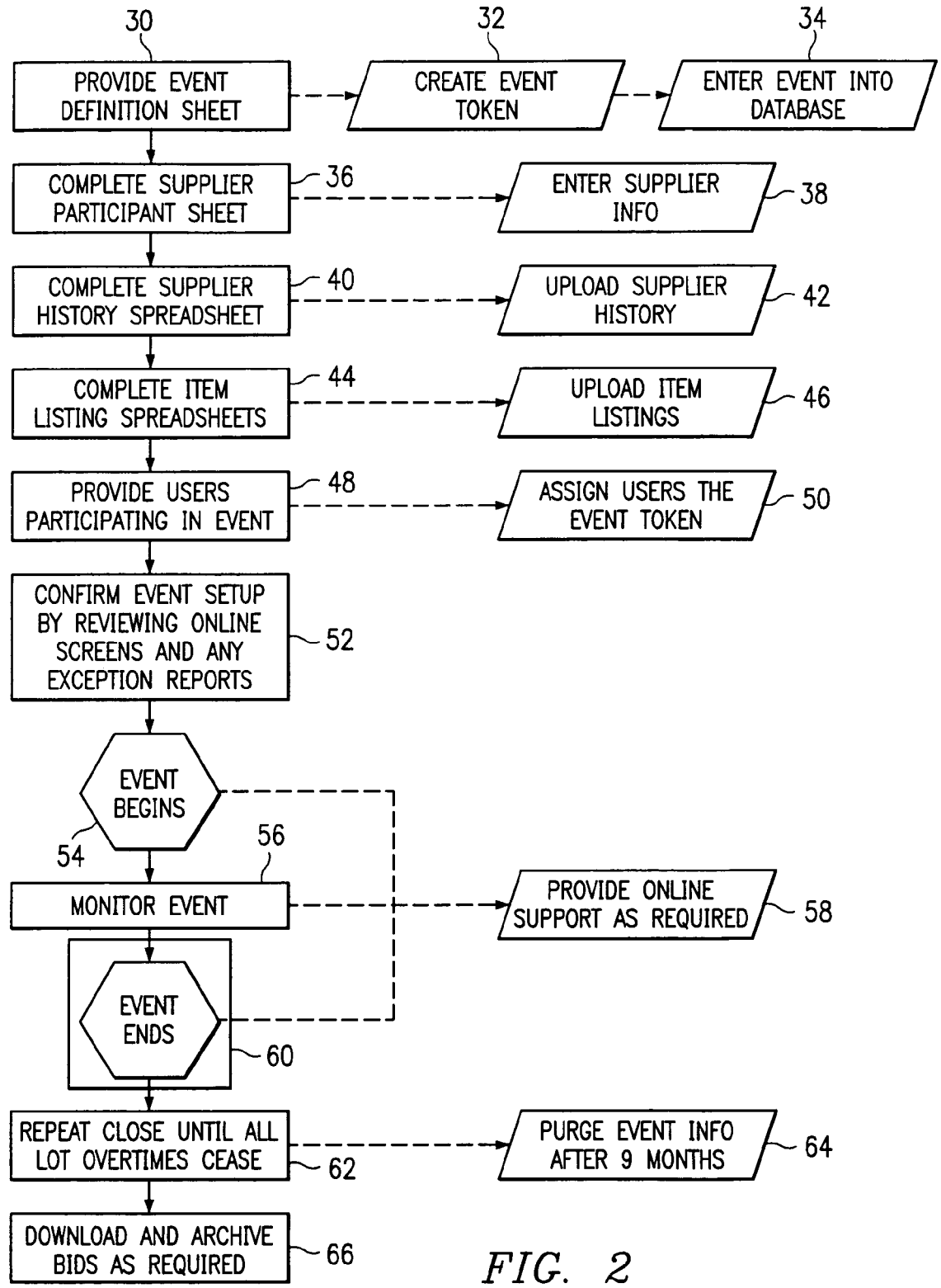
FIG. 2 is a process flow diagram of an embodiment of online competitive supplier price quoting event process constructed according to the teachings of the present invention.

FIG. 2 is a process flow diagram of an embodiment of an online competitive supplier price quoting event process constructed according to the teachings of the present invention. In block 30, an event definition worksheet is completed and submitted by a purchasing agent, for example. The event definition worksheet contains details about the event, such as event name, event start date, event start time, event end date, event end time, event overtime, and default event currency. The event overtime is the amount of time that may be extended beyond the event end time starting from the time of the last bid. When the completed event definition worksheet has been submitted, a unique event token is created, as shown in block 32. The event token and the data associated with the event are then stored into the event data table, as shown in block 34. In block 36, the purchasing agent completes a supplier participant worksheet. The supplier participant worksheet is used to solicit information about the suppliers that will be asked to bid in the event. The supplier participant worksheet includes a unique supplier code that identifies the supplier, a supplier name, a list of user identifiers of users that will be able to supply price quotes on behalf of the supplier, and the amount of old business the supplier has done in the past with the business enterprise. The data provided in the supplier participant worksheet is then stored in the supplier table, as shown in block 38. In block 40, the purchasing agent then completes the supplier history worksheet, which is used to capture past dealings of the supplier on any of the commodities that are being quoted in the event. For example, supplier history worksheet may include the supplier code, a new item name or some other identifier of the item to be quoted, an old item name of the item as it was previously identified in business dealings between the supplier and the business enterprise, old item price, and old item quantity. The information contained in the supplier history worksheet is stored in the supplier history table, as shown in block 42. In block 44, the purchasing agent completes an item listing worksheet which is used to capture details of the items that will be quoted in the event. The item listing worksheet may include the category and sub-category of the item, an item name or some other identifier, a description of the item being quoted, and a lot quantity describing the number of items in the lot being quoted on. The worksheet also includes an increment value for bids, a start price, and a target price. The target price is the price that the business enterprise would like to be able to purchase the lot for. The item list information contained the worksheet is then stored in the appropriate database table(s), as shown in block 46. The users who will have authorization to participate in the event are identified and each user is provided the event token so that the user can have access, as shown in blocks 48 and 50. In block 52, the purchasing agent may verify that all the information submitted are correct and are stored properly. The purchasing agent may view the online screens and any exception reports that are generated associated with data submission, as shown in block 52. Errors are corrected prior to the event.

At the appointed date and time, the event automatically begins to allow the suppliers to submit price quotes in those events for which its representatives possess the event token and whose user identifier was submitted when the event worksheets were filled out, as shown in block 54. Because the suppliers may access the system via the Internet using web browsers, a supplier's representative is not tied down to any computer or workstation that has special software. The supplier's representatives may monitor and submit price quotes from any computer at any geographical location that has a web browser application and is able to access processing servers 18 via the Internet. During the bidding period, the purchasing agent and the suppliers may monitor the event, as shown in block 56, but the purchasing agent and the supplier representatives may have access to different event information. For example, the suppliers may view the lowest quoted price, but is unable to view the identity of the supplier that submitted the lowest price quote. The purchasing agent or any employee of the business enterprise holding the event is unable to view the minimum price quote during or after the event. However, the minimum bid submitted by all the suppliers are stored for future reference or analysis.

In the preferred embodiment of the present invention, a supplier representative is able to enter actual and minimum bids for multiple items or lots in the event. Either or both actual and minimum bid amounts may be entered by the supplier at any time during the bidding period. The actual bid is a price quote the supplier is submitting in competition with other bidders. The minimum bid is the lowest price that the supplier is willing to sell the commodity. The minimum bid is used by the system of the present invention to automatically submit lower bids on behalf of the supplier when the supplier's actual bid is not the winning bid and the supplier's minimum bid is not yet reached. The bid entry screen may also include buttons or icons that allow the user to submit the bid once he or she has entered all the actual bids and/or minimum bids, and to allow the user to clear all non-submitted bid entries. Once the submit bid button is clicked by the user, the system may display a pop-up dialog window confirming the submission of the bids.

Online support is available to help suppliers to navigate the pages, enter price quotes, and view information, as shown block 58. If necessary, online support staff may enter an actual or minimum bid for a supplier representative if he or she is experiencing difficulties.

When the predetermined event end time is reached, bidding for those lots which do not experience bidding activity within a predetermined amount of time prior to the event end time are closed, as shown in block 60. As long as bidding activity continues for certain lots, these lots go into overtime. For example, as long as there is bidding activity within the past thirty minutes, for example, bidding for the lot continues. Therefore, bidding on items in an event continues until all lot overtime ceases, as shown in block 62. The logged price quote data for the event are downloaded and stored in a database and may be purged after a predetermined period, such as nine months, as shown in blocks 64 and 66.

Figure 3:
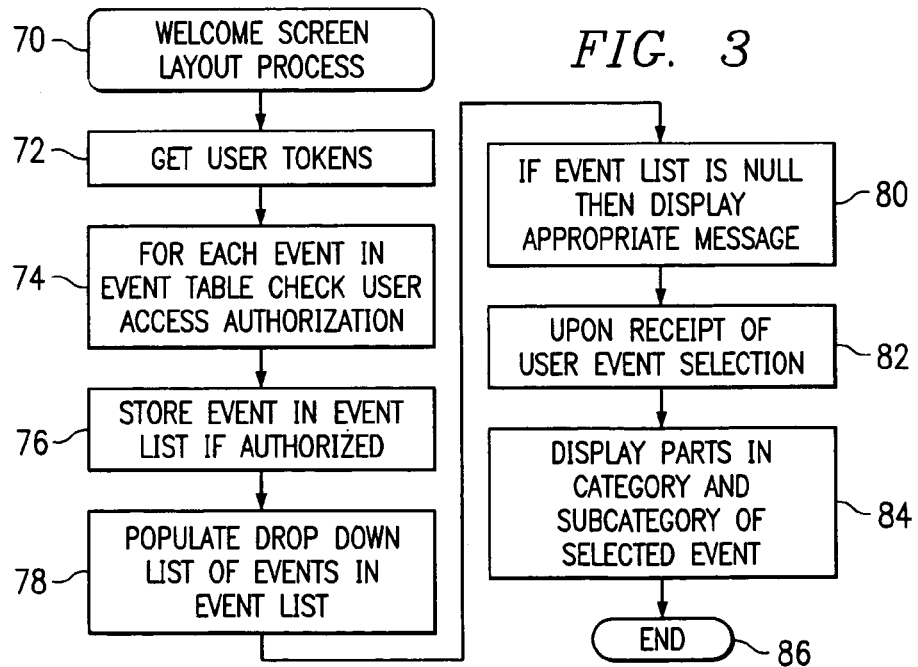
FIG. 3 is a flowchart of an embodiment of a welcome screen layout process constructed according to the teachings of the present invention.

With an understanding of the overall process flow of the competitive online price quoting process, the details of the system and method of the present invention are now examined. FIG. 3 is a flowchart of an embodiment of a welcome screen layout process 70 constructed according to the teachings of the present invention. All or most of the screen layouts used in the present invention may employ the same format with title graphics for the name of the web site, a menu bar or tool bar, company logos and slogans, and other navigational aides such as buttons and drop-down-lists. For example, the user may choose to see a summary of all of his/her bids by clicking on a "My Bids" button, or a summary of the supplier's last year sales volume by clicking on a "My History" button, for example. A bulletin board function that allows the business enterprise to post notices and information related to the events may also be accessed from this point. The detailed process to configure and format the general screen layout is not described herein. In blocks 72 and 74, the user's one or more tokens are obtained from and compared with the event tokens of all the events stored in event table 22. If any of the user's tokens matches an event's token, then the event identifier of that event is stored in an event list, as shown in block 76. The event names of the events in the event list are then used to populate a drop-down list on the web page or screen, as shown in block 78. The drop-down list is but one way of displaying all the events that the user is authorized to participate in, and allowing the user to select an event to begin the bidding process. If the event list is null, then an appropriate message is displayed to inform the user, as shown in block 80. Upon receipt of an event selection submitted by the user, the categories and subcategories in the selected event are displayed in a new screen, as shown in block 82 and 84. This process ends in block 86. Upon selection of a category or subcategory, the screen displays a bid entry screen containing all the lots that are currently active.

For example, the bid entry screen may include a table of the form:

| Part # | Description | QTY | Bid Incr. | Target Price | Current Bid | Status | Actual Bid | Min. Bid |
|---|---|---|---|---|---|---|---|---|
| WSB-123 | BOLT | 30,000 | 0.001 | 0.023 | 0.027 | W | | |
| XYZ-111 | HEX NUT | 100,000 | 0.005 | 0.022 | 0.025 | L | | |
| ABC-222 | WASHER | 100,000 | 0.001 | 0.010 | 0.018 | W | | |

The actual and minimum bid entries are blank fields that can be filled in by the user to submit bids. It may be seen that the user may enter bids for multiple lots on the same screen, if so desired. A "Submit Bid" button is provided to allow the user to enter the bid into the system, and a "Clear Bid" button is provided to allow the user to easily clear the bid entries and not submit any bid.

Figure 4:
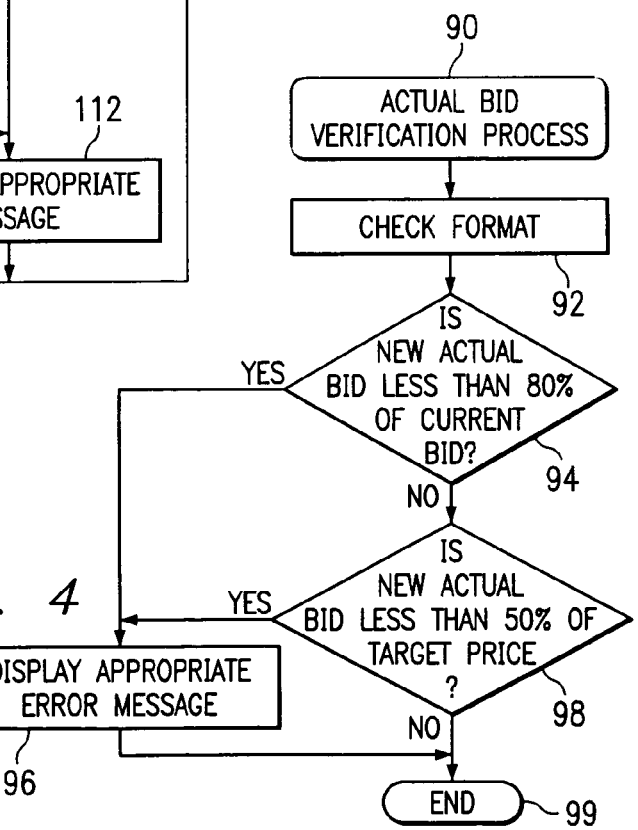
FIG. 4 is a flowchart of an embodiment of an actual bid verification process constructed according to the teachings of the present invention.

FIG. 4 is a flowchart of an embodiment of an actual bid verification process 90 constructed according to the teachings of the present invention. In the preferred embodiment of the present invention, this actual bid verification process is performed on the client side computer prior to transmission to the server side computer or server. Process 90 is used to provide initial verification of the actual bids submitted by the user. In block 92, the format of the submitted actual bid is checked such that the only permitted characters are numerical characters and one decimal character. The new actual bid amount is compared with the current bid, as shown in block 94. The current bid is the current lowest bid or the current winning bid. If the new actual bid is less than 80% of the current bid, then an appropriate error message is displayed, as shown in block 96. If the new actual bid is less than 50% of the target price provided by the supplier, as determined in block 98, an appropriate error message is also displayed. These checks ensure that the actual amount entered by the user is not out of line due to typographical errors. The actual bid verification process ends in block 99.

Figure 5:
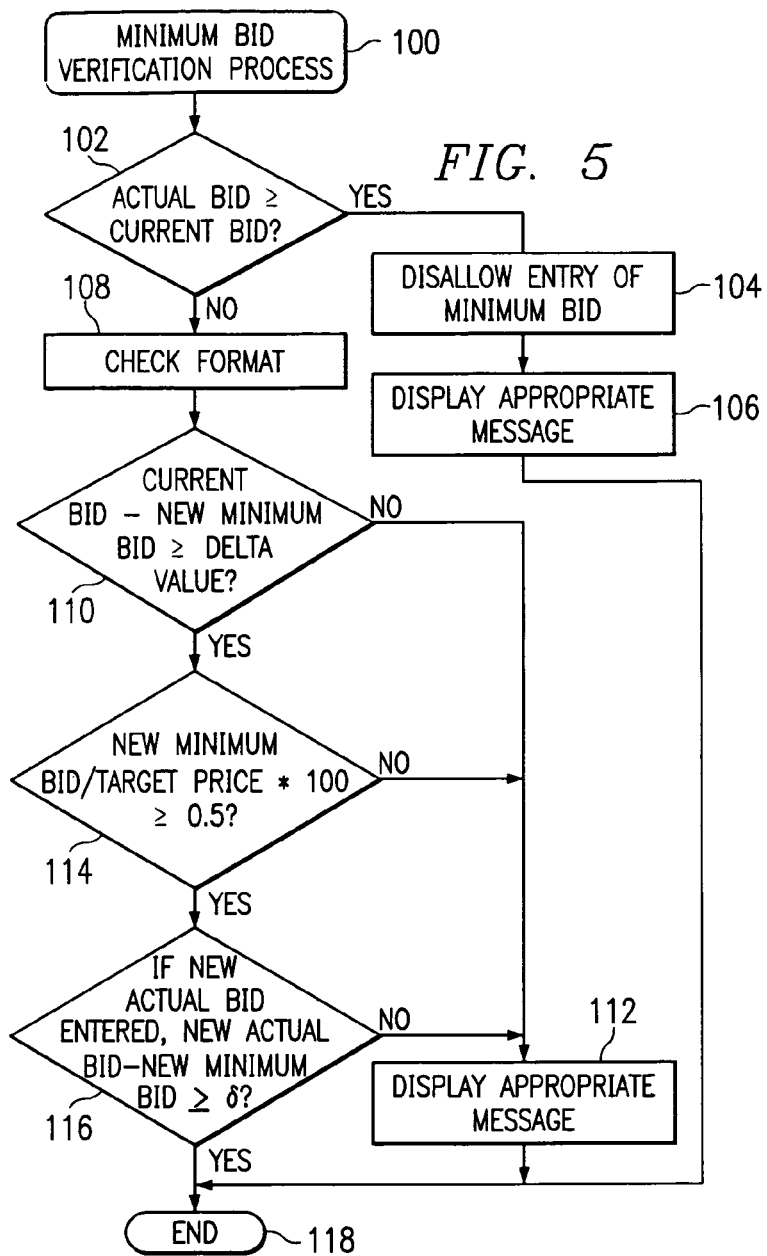
FIG. 5 is a flowchart of an embodiment of a minimum bid verification process constructed according to the teachings of the present invention.

FIG. 5 is a flowchart of an embodiment of a minimum bid verification process 100 constructed according to the teachings of the present invention. Minimum bid verification process is preferably performed on the client side computer to check all minimum bids submitted by the user. In blocks 102 and 104, if the actual bid amount associated with the minimum bid is greater than or equal to the current lowest bid, then the minimum bid is not allowed. An appropriate message is displayed to inform the user, as shown in block 106. In block 108, the format of the minimum bid is checked to ensure that only numerical characters and one decimal character are present. In block 110, whether the current lowest bid minus the minimum bid is greater than or equal to a predetermined delta value is determined. This check determines whether the submitted minimum bid is sufficiently less than the current lowest bid. For example, the delta value may be the default bid decrement. In block 114, whether the new minimum bid is greater than or equal to the target price set by the business enterprise is determined. This check ensures that the minimum bid is not out of line due to typographical mistakes. Appropriate error messages are displayed when these checks fail, as shown in block 112. In block 116, if the minimum bid has an associated new actual bid entry, then the difference between the new actual bid and the new minimum bid should be greater than or equal to the delta value. Appropriate error messages are displayed if this condition is not met, as shown in block 112. The process ends in block 118.

FIGS. 6A-6D form a flowchart of an embodiment of a bid entry process 120 constructed according an embodiment of the present invention. Bid entry process 120 is preferably performed on the server side. Although not explicitly shown, the bid entry process may also include the same verification process shown in FIG. 5. In block 122, the new actual bid and/or minimum bid are received. For any given lot, the user may submit only an actual bid, only a minimum bid, or both an actual bid and a minimum bid. In block 123, it is first determined whether the current winner (also referred to as the old winner) has a minimum bid. If not, then the bid verification process proceeds to FIG. 6D. On the other hand, if the old winner does have a minimum bid, then if the user only submitted a new minimum bid, it is determined whether the new minimum bid is greater than the old minimum bid submitted previously by the current winner, as shown in block 124. If so, the old winner remains the current new winner, as shown in block 126. In blocks 128, 130 and 132, if the new minimum bid minus a predetermined bid decrement (δ) is greater than the old minimum bid submitted by the current winner, then the current lowest bid is the new minimum bid minus the bid decrement, otherwise the current lowest bid is the old minimum bid.

If the new minimum bid is equal to the old minimum bid, as determined in block 134, then the winner is the old winner and the current bid is the old minimum bid, as shown in blocks 136 and 138. If the new minimum bid is less than the old minimum bid, then the winner is the new bidder, as shown in block 140. If the old minimum bid minus the predetermined bid decrement is greater than or equal to the new minimum bid, as determined in block 142, then the current lowest bid is the old minimum bid minus the bid decrement, otherwise the current bid is the new minimum bid, as shown in blocks 144 and 146. The process ends in block 148.

Figure 6A:
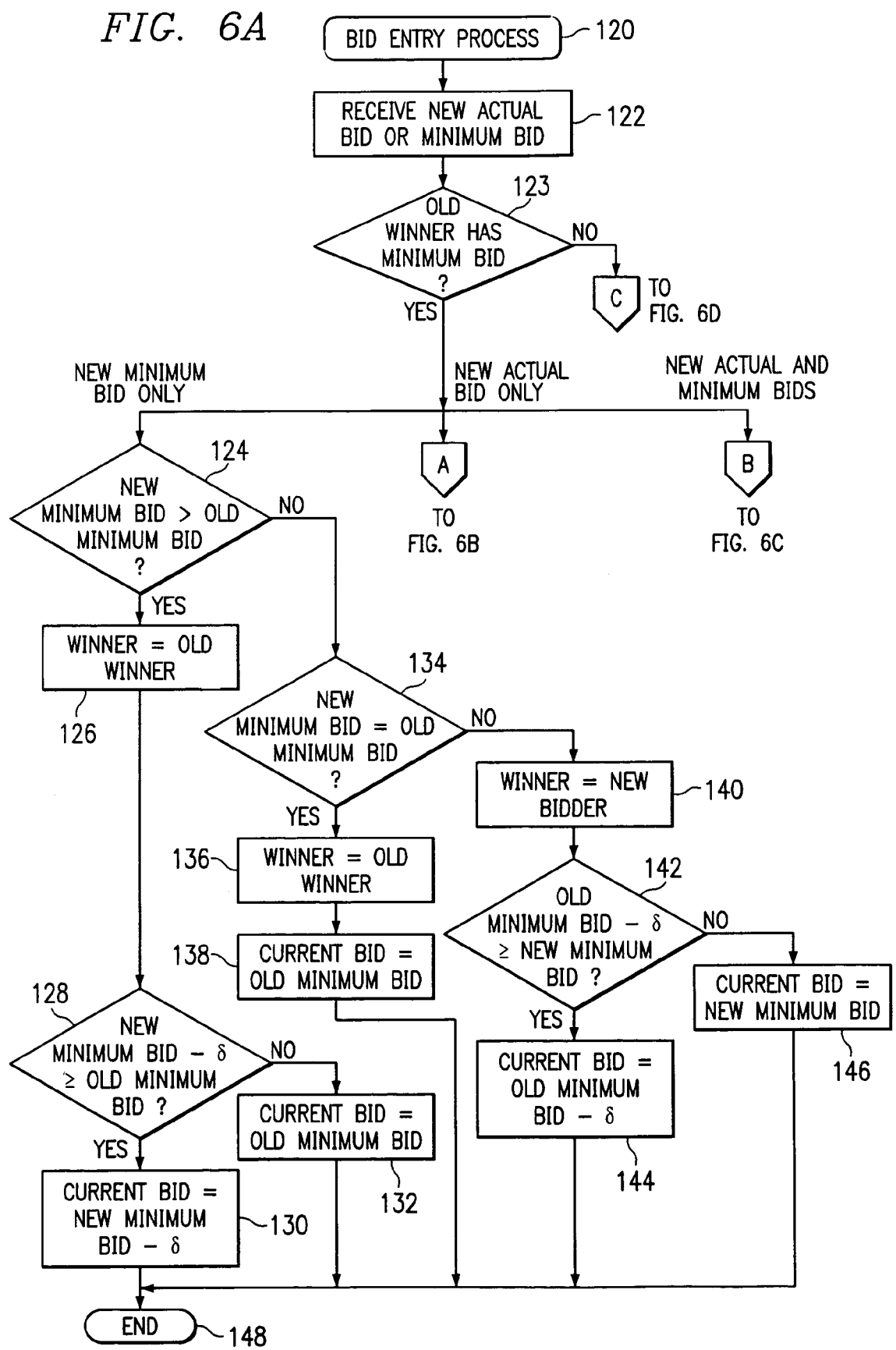
FIGS. 6A-6D are a flowchart of an embodiment of a bid entry process constructed according an embodiment of the present invention.
Figure 6B:
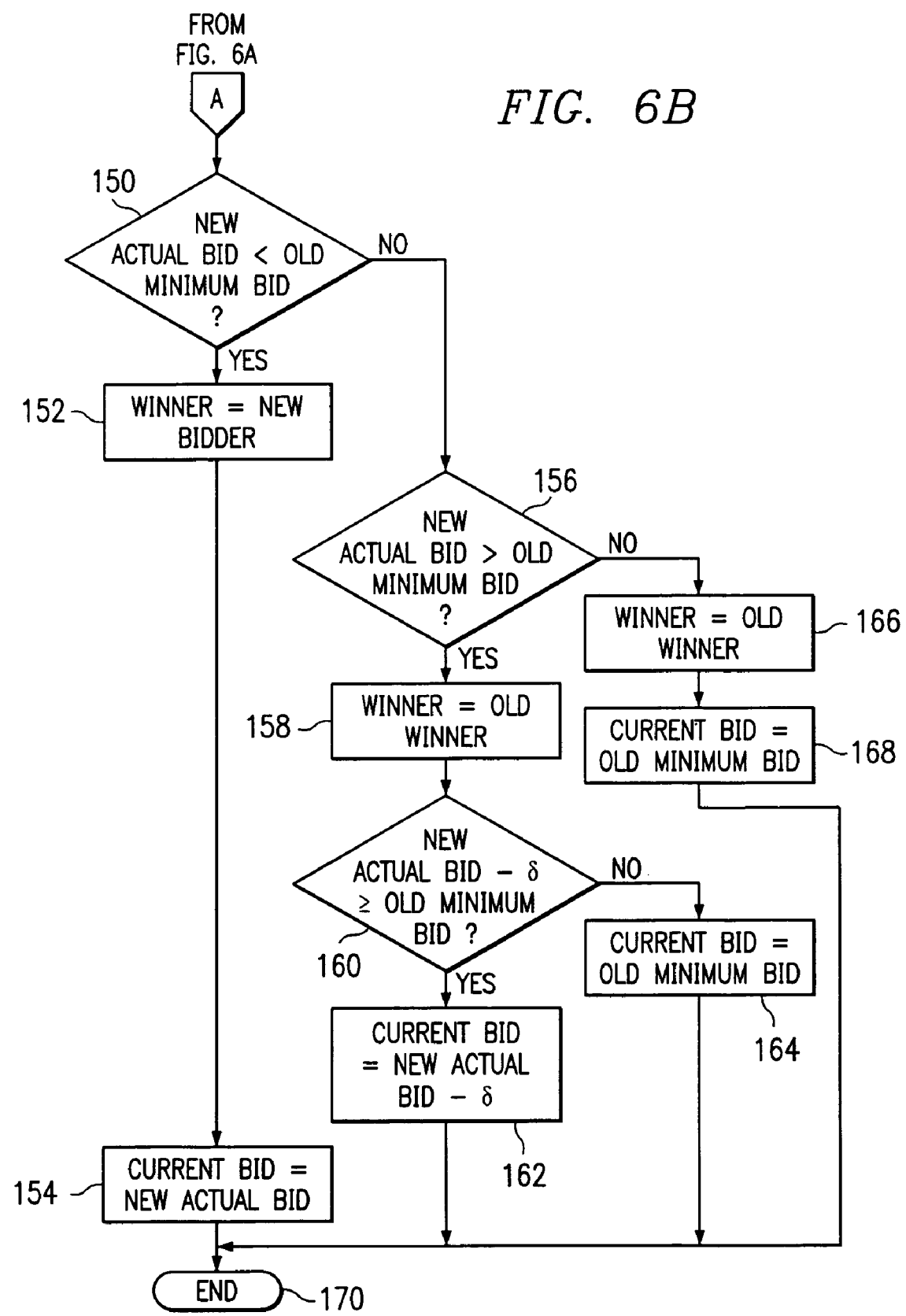

If the user only submitted a new actual bid for a given lot, then if the new actual bid is less than the old minimum bid, as shown in block 150 in FIG. 6B, then the winner is the new bidder and the current bid is the new actual bid, as shown in blocks 152 and 154. Otherwise, if the new actual bid is greater than the old minimum bid, as determined in block 156, then the winner is the old winner, as shown in block 158. If the new actual bid minus the bid decrement is greater than or equal to the old minimum bid, as determined in block 160, then the current lowest bid is the new actual bid minus the bid decrement, as shown in block 162, otherwise the current bid is equal to the old minimum bid, as shown in block 164. If the new actual bid is equal to the old minimum bid, then the winner is the old winner and the current lowest bid is the old minimum bid, as shown in blocks 166 and 168. The process ends in block 170.

Figure 6C:
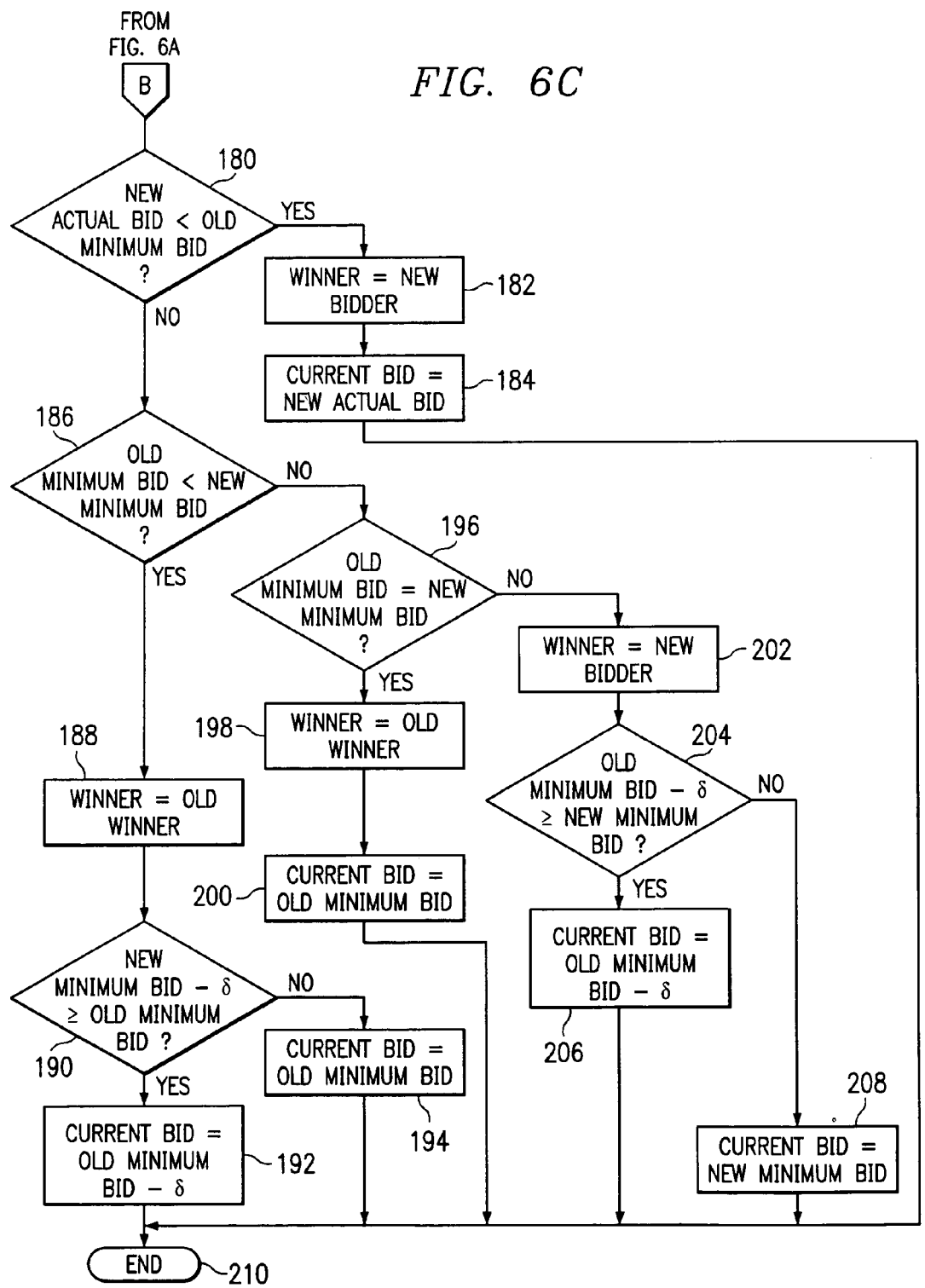

In FIG. 6C pertaining to the situation when the user submits both an actual bid as well as a minimum bid, it is determined whether the new actual bid is less than the old minimum bid, as shown in block 180. IF so, the winner is the new bidder and the current bid is the new actual bid, as shown in blocks 182 and 184. If the new actual bid is not less than the old minimum bid, then it is determined in block 186 whether the old minimum bid is less than the new minimum bid. If so, the winner is the old winner, as shown in block 188. If the new minimum bid minus the predetermined bid decrement is greater than or equal to the old minimum bid, as determined in block 190, then the current bid is the old minimum bid minus the bid decrement, as shown in block 192. Otherwise the current bid is the old minimum bid, as shown in block 194. If the old minimum bid is the new minimum bid, as determined in block 196, then the winner is the old winner and the current lowest bid is the old minimum bid, as shown in blocks 198 and 200. In block 202, the winner is the new bidder, since the old minimum bid is greater than the new minimum bid. If the old minimum bid minus the bid decrement is greater than and equal to the new minimum bid, as determined in block 204, then the current lowest bid is the old minimum bid minus the bid decrement, as shown in block 206, otherwise the current bid is the new minimum bid. The process ends in block 210.

Figure 6D:
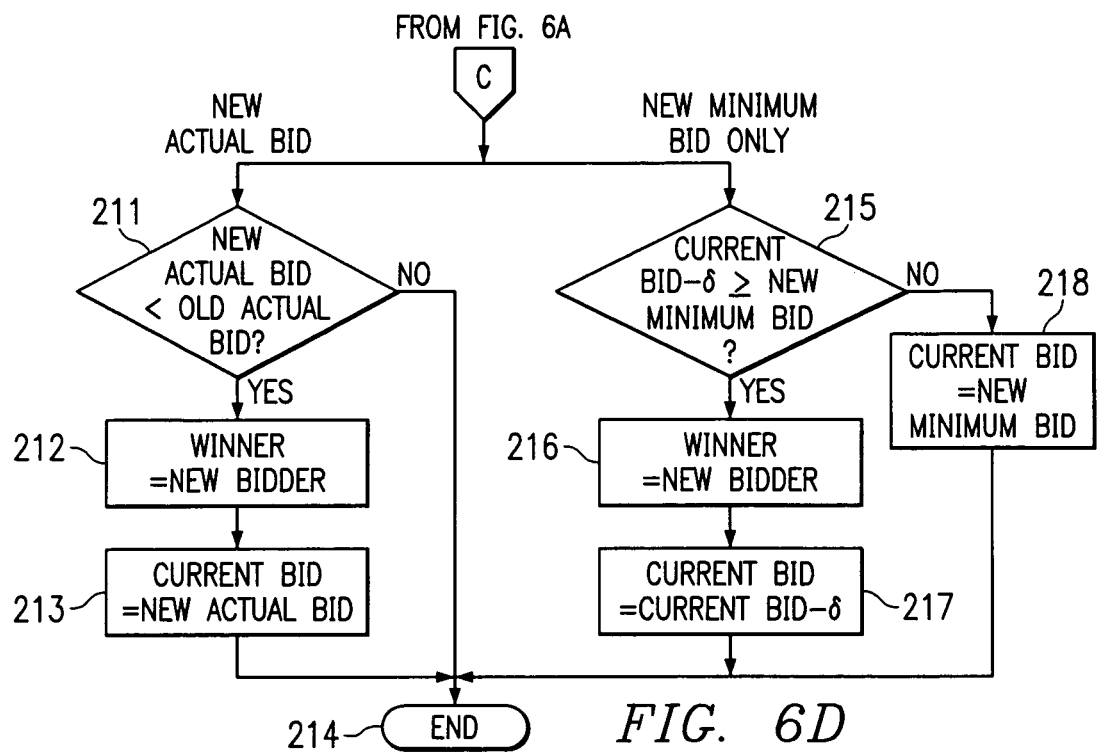

Referring to FIG. 6D, the bid entry situation in which the old winner does not have a minimum bid is addressed. If the new bidder has entered an actual bid, then it is determined whether the new actual bid is less than the old actual bid of the old winner, as shown in block 211. If so, then the new bidder is declared as the new winner and the current bid is set equal to the new actual bid, as shown in blocks 212 and 213. If the new actual bid is not less than the old actual bid, then the process ends in block 214, and the winner remains the old winner. If the new bidder only entered a minimum bid, then it is determined whether the current bid minus the delta value is greater than or equal to the new minimum bid, as shown in block 215. If so, then the new bidder is the new winner and the current bid is set equal to the current bid minus delta, as shown in blocks 216 and 217. If in block 215 it is determined that the current bid minus delta is less than the new minimum bid, then the current bid is set equal to the new minimum bid, as shown in block 218. The process ends in block 214.

After the bids are verified and entered in the system, a bid confirmation page may be displayed that provides a summary of all the bids. For example, information may be displayed in a tabular format having the following information:

| Part # | Lot # | Description | QTY | Target Price | Actual Bid | Min. Bid | Confirm. ID | Confirm. Time |
|---|---|---|---|---|---|---|---|---|
| WSB123 | 123 | BOLT | 30,000 | 0.023 | 0.033 | 0.026 | 200 | 28/1/00 9:32:05 |
| XYZ111 | 126 | HEX NUT | 100,000 | 0.022 | 0.029 | — | 201 | 28/1/00 9:32:05 |
| ABC222 | 130 | WASHER | 100,000 | 0.010 | — | 0.020 | 202 | 28/1/00 9:32:05 |

It may be seen that the actual and/or minimum bid amounts entered by the user are displayed, as well as the time that the bids were entered. Confirmation identifiers are provided to identify the bid entry for each lot.

From here on, the user may return to the same category and subcategory of lots by clicking on an appropriate link on the bid confirmation screen, such "return to parts list" to continue biding on the same lots. Alternatively, the user may view a summary of all of his/her bids ("My Bids"), or a summary of the supplier's last year sales volume for the same parts that are in the event ("My History"). A bulletin board function that allows the business enterprise to post notices related to the events may also be accessed from this point.

Figure 7:
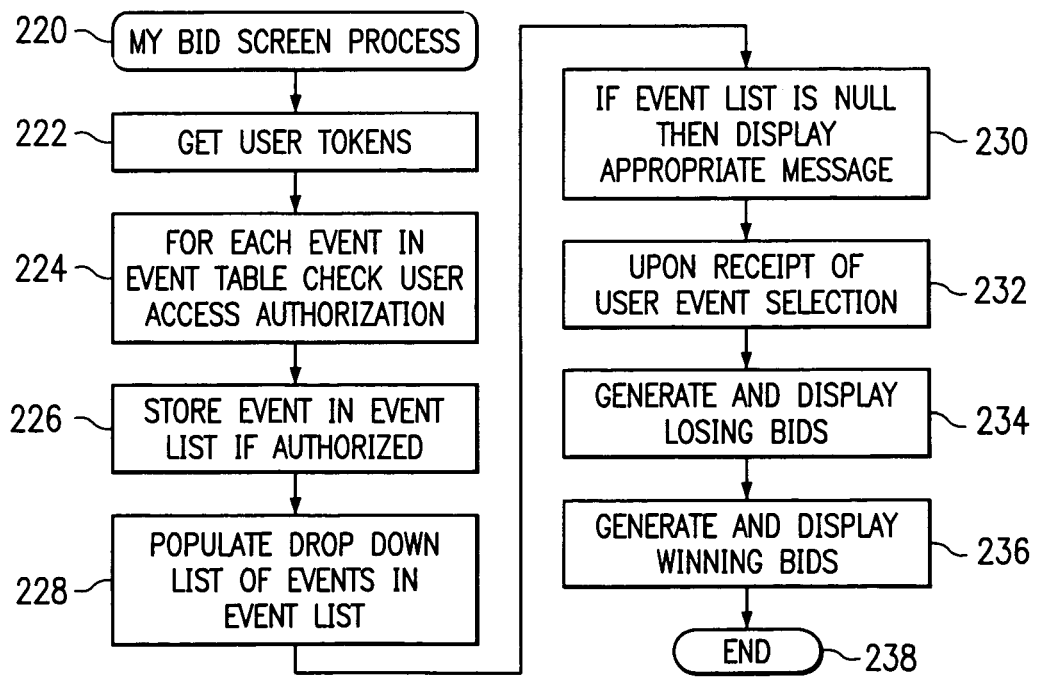
FIG. 7 is a flowchart of an embodiment of a my bid screen process constructed according to the teachings of the present invention.

FIG. 7 is a flowchart of an embodiment of a "My Bid" screen layout process 220 according to the teachings of the present invention. My bid refers to a web page that provides a summary of a supplier's actual bids, minimum bids, and the status of each bid. This information is only accessible by the supplier's own representatives. In block 222, the user's token is obtained and verified for access authorization. For each event in the event table, the user's access authorization is checked and verified, a shown in block 224. All the authorized events are stored in an event list, as shown in block 226. The drop-down event list is then populated with the events in the event list, as shown in block 228. If the resultant event list is null, then an appropriate message informing the user is displayed, as shown in block 230. The user may use the populated pull-down list to select an event, which is received by the system, as shown in block 232. The system then generates a list of losing bids and a list of winning bids along with relevant information for each bid entry, as shown in block 234 and 236. The losing bid table may include a part number, lot number, description of the part, quantity, current winning bid amount (entered by some other supplier), and the supplier's actual and minimum bids. The losing bid table may incorporate hypertext links to the bid entry screen to allow the user to enter new bids. For example, the part number of each part may be a hypertext link to the bid entry screen for that part if bidding is still open for that lot. The winning bid table may also include the same information, except the winning bid amount is the bid entered by the supplier. In addition, a summary of winning bid may also be displayed. The winning bid summary provides a total business amount for each subcategory that represents the winning bid submitted by the supplier multiplied by the quantity. A grand total is also provided that sums the total business amount of all lots in which the supplier has a winning bid. This value is compared with a historical amount that represents the amount of business the supplier did with the enterprise in the past for the same parts, if applicable. The my bid screen may update itself automatically or by clicking on the refresh or reload button of the browser application.

FIG. 8 is a flowchart of an embodiment of "My History" screen process 240 according to the teachings of the present invention. My history refers to a web page that provides a summary of a supplier's past business transactions with the enterprise. Preferably only the last year's sales volume is shown. This information is only accessible by the supplier's own representatives. In block 242, the user's token is obtained and verified for access authorization. For each event in the event table, the user's access authorization is checked and verified, a shown in block 244. All the authorized events are stored in an event list, as shown in block 246. The drop-down event list is then populated with the events in the event list, as shown in block 248. If the resultant event list is null, then an appropriate message informing the user is displayed, as shown in block 250. The user may use the populated pull-down list to select an event, which is received by the system, as shown in block 252. The system then generates and displays a list of part numbers for parts in the selected event, and the price of each which the supplier sold to the enterprise in the past year, and a quantity figure for each part. Recall that this information is stored in supplier history table 26. The total amount of sales associated with these parts are also displayed. If a part has been replaced by a new part, then the corresponding part and part number are mapped to the new part and new part number, so that the sale history of the old part can be compared with the current bidding on the new part. The process ends in block 256.

FIG. 9 is a flowchart of an embodiment of a administration screen process 260 according to the teachings of the present invention. The administration screen provides the winning bid history of all the suppliers for a selected event and is only accessible to pre-appointed administrators of the business enterprise. In blocks 262 and 264, the user's token is obtained and compared to the tokens of the events in the event table to verify the user's authorization to access the administration screen. In blocks 266 and 268, the event drop-down list on the screen is populated with a list of events accessible to the user. An appropriate message is displayed if the event list is null, as shown in block 270. For the selected event, the history of winning bids of all the suppliers are generated and displayed, as shown in block 272. For each supplier, their old business value and new business value based on the winning bids are also displayed, as shown in blocks 273 and 274. The percentage difference between the old business value and new business value is also generated and displayed. The administration screen also includes a "Close Auction" button which allows the administrator to close the auction with respect to any lot that has not seen any bidding activity within the last thirty minutes, for example. The administrator may click on this button to close all currently inactive auctions, as shown in block 276. Alternatively, the system may automatically detect inactivity in an auction for a lot and automatically close it. The process ends in block 278. However, the user may choose to click on the hypertext links associated with the suppliers' names to go to a supplier summary screen, or to click on the hypertext link associated with the total to go to a savings summary page.

FIG. 10 is an embodiment of a supplier summary screen layout process 280 according to the teachings of the present invention. The supplier summary screen is reachable by clicking on the appropriate hypertext links on the administration screen. In block 281, the user's token is verified for authorization to access the information in the supplier summary screen. This screen is only accessible by administrators of this system. The title of the event and the supplier name are displayed on the screen. The event and supplier name selection was performed on the administration screen described above. In block 286, the winning bids of the supplier are displayed by category and subcategory. The part numbers, part description, winning bid, quantity, and other information may be displayed. The supplier summary screen also includes a "Close Auction" button which allows the administrator to close the auction with respect to any lot that has not seen any bidding activity within the last thirty minutes, for example. The administrator may click on this button to close all currently inactive auctions, as shown in block 288. Alternatively, the system may automatically detect inactivity in an auction for a lot and automatically close it. The process ends in block 290.

FIG. 11 is a flowchart of an embodiment of a savings summary screen process 300 constructed according to the teachings of the present invention. In blocks 302-306, the user's token is obtained and verified for authorization to access this screen, and the authorized events are stored in an event list. The event list is used to populate a drop-down list on the screen, a shown in block 308. If the event list is null, then an appropriate message is displayed, as shown in block 310. The user may select an event from the drop-down list, as shown in block 312. In blocks 314-322, the historical values for each supplier, the current business value represented by the winning bids of the suppliers, the adjusted baseline, and the savings from using online quoting are generated and displayed. For example, this information may be displayed in a tabular format shown below:

| Supplier Name | Historic Value | Online Bids | % Change |
|---|---|---|---|
| Supplier A | 35,000 | 38,014 | 9 |
| Supplier B | 62,036 | 56,900 | −8 |
| Total | 97,036 | 94,914 | — |
| Un-invited + New Parts | 55,555 | | |
| Initial Baseline | 152,591 | | |
| Total Historic Value | 152,591 | | |
| Historical Value of Parts with No Bids | 4,000 | | |
| Adjusted Baseline | 148,591 | | |
| Online Bid Savings | 36% | | |
| | 53,677 | | |

As seen above, the sum of winning bids to date for each supplier participating in the selected event is shown. The historical value represents past sales from the supplier to the enterprise for the same or similar parts in the event. The un-invited value represents those part auctions which the suppliers are not invited to but had a history of selling those parts to the enterprise. This information is also derived from the supplier history table. The new parts values are pulled from the event table and represent those parts which cannot be mapped to an old part and therefore do not have any basis for historical comparison. The historical value of parts with no bids amount represents the dollar amount for parts that have been sold to the enterprise by these suppliers but these suppliers have not bid on these parts. The baseline value is adjusted accordingly. The savings derived from using online quoting as compared to historical data are also computed and displayed. The savings are displayed as a dollar amount as well as a percentage.

The detailed data of the event may be downloaded as a file by the administrator. The data may be provided in a spreadsheet format so that the administrator can manipulate them easily. An exemplary spreadsheet format for the downloadable event data is set for the below:

| Bid Id | Category | Subcategory | Part # | Lot # | Qty | Supplier Code | Actual Bid | Min Bid | Time Stamp | User Id |
|---|---|---|---|---|---|---|---|---|---|---|
| 110 | Vol 1 | Bolts | WS-M34 | 3 | 400 000 | AEIJ | 0.034 | *.* | 1/2/00 9:40 | WJK |
| 111 | Vol 1 | Bolts | WK-M34 | 3 | 400 000 | QWH | 0.032 | — | 1/2/00 9:42 | ACE |
| 112 | Vol 1 | Bolts | WK-M34 | 3 | 400 000 | TTW |  | *.* | 1/2/00 9:45 | RFT |

It may be seen in the table above that the bids in the event are assigned identifiers and are arranged in the table sequentially by the bid identifiers. The timestamp provides the actual date and time the bids or price quotes were placed. The price quotes may include an actual bid and/or a minimum bid. As indicated above, the administrator is not able to access the amount of the minimum bids submitted by the suppliers. However, the system may archive the minimum bid amounts for a predetermined period of time for analysis and other purposes.

Therefore, it may be seen that the present invention provides a system and method for a business enterprise to engage its suppliers in competitive online bidding for the opportunity to supply goods and services. The present invention allows the suppliers to submit an actual bid and a minimum bid, where the minimum bid in effect instructs the system to automatically and continuously submit actual bids on behalf of the supplier when necessary to win the event until the minimum bid amount is reached. Because the system allows suppliers to submit bids that are not lower than the current winning bid, the business enterprise does not need to, and is not obligated to, accept the lowest bid and award the business to the supplier that won the event. The supplier is able to submit bids and see bidding status of all the lots in an event he/she is participating in on one bid entry screen. Each lot is further identified by color to indicate whether the supplier has the winning bid, is not successful with the last bid submitted, or has not submitted a bid. The supplier and the event administrator are able to compare the current bids to historical data such as the price and quantity that the supplier sold the same part to the business enterprise in the previous year. The system provides the event supplier an amount and a percentage that represent savings from the previous year. If the part numbers have been changed or old parts have been replaced with comparable new parts, the bids on the new parts are linked and compared to the historical value associated with the old parts. The system performs currency conversions so that a supplier is able to submit price quotes in his/her home or preferred currency, and view bidding status in the home or preferred currency. The event administrator, when viewing bidding status or history, sees all submitted bids and other monetary information in the default currency of the event. Bidding on an event may be extended beyond the preset time period and may continue with respect to a particular lot until no bidding activity occurs for a predetermined amount of time. The event administrator is able to access or download a log of all bids submitted in an event, along with all the relevant information. Finally, because the auction is web-based, suppliers do not need special software or hardware to access the auction and place bids. Therefore, the use of the online price quoting system and method of the present invention allows a business enterprise to quickly receive bids from suppliers, thus creating a competitive bidding environment and encouraging historically lower prices. Therefore, the present invention not only speeds up the price negotiation process, but also enables the suppliers to more clearly appreciate where they stand with respect to their competition and the true market price for commodities.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A method of conducting an online competitive price quoting event for at least one commodity, comprising:
   storing event data associated with the event into at least one data table;
   storing commodity data associated with the at least one commodity into the at least one data table;
   storing supplier data associated with a plurality of suppliers who will participate in the event into the at least one data table;
   storing historical data associated with past transactions related to the at least one commodity of the plurality of suppliers;
   storing a default currency for the event into the at least one data table;
   storing a preferred currency for each of the plurality of suppliers into the at least one data table;
   assigning an event token to the event and providing the event token to the suppliers;
   granting access authorization to agents representing the plurality of suppliers in response to receiving the event token for the event;
   displaying a bid entry screen to the agents listing the at least one commodity as at least one entry, a current winning bid in the preferred currencies of the suppliers, a target price in the preferred currencies of the suppliers, status of the agents' bids, and entry fields for receiving an actual bid and a minimum bid;
   comparing the actual bid to the current winning bid and a current minimum bid in response to receiving the actual bid from an agent, the actual bid representing the price at which the supplier is willing to sell the at least one commodity;
   comparing the minimum bid to the current winning bid and the current minimum bid in response to receiving the minimum bid from the agent, the minimum bid representing the lowest price the supplier is willing to sell the at least one commodity;

determining a new current winning bid based at least in part on the comparisons of the actual bid and the minimum bid to the current winning bid and the current minimum bid;

updating the bid entry screen with the new current winning bid;

color coding the at least one entry on the bid entry screen to reflect the current status of the agent's bids;

computing a total price representative of the winning bid for the at least one commodity;

comparing the total price for the at least one commodity with a historical total for a commodity comparable to the at least one commodity that the supplier of the winning bid supplied in one or more previous events; and computing a difference between the total price and the historical total.

2. The method, as set forth in claim 1, further comprising generating a bid summary of a supplier including a part number of the at least one commodity, a lot number, a quantity, the target price, the actual bid submitted, the minimum bid submitted, a confirmation identifier, and a confirmation time.

3. The method, as set forth in claim 1, further comprising:
granting access authorization to an event administrator in response to receiving the event token for the event;
generating a savings summary of the event including names of suppliers who has a winning bid for a commodity, a historical value for each supplier representing past sales figures for the commodity, a bid value representing the sales figure for the commodity in the current event, and a change value representing the difference between the historical value and the bid value.

4. The method, as set forth in claim 1, further comprising:
granting access authorization to an event administrator in response to receiving the event token for the event;
generating a savings summary of the event including:
    names of suppliers who have a winning bid for the at least one commodity;
    a historical value for each supplier representing past sales figures for the commodity;
    a bid value representing the sales figure for the commodity in the current event;
    an adjusted baseline value representing the historical value being adjusted for parts that the suppliers are not invited to bid, new parts without historical value, and parts with historical value that the suppliers have not bid on; and
    a change value representing the difference between the historical value and the bid value.

5. The method, as set forth in claim 1, further comprising:
granting access authorization to an event administrator in response to receiving the event token for the event;
generating a detailed event summary of the event, wherein each entry includes:
    a bid identifier;
    a part number of the at least one commodity;
    a quantity;
    a supplier identifier of the supplier with the winning bid;
    an actual bid;
    a minimum bid indicator if a minimum bid was submitted;
    a timestamp of the bid; and
    a user identifier of the agent who submitted the winning bid.

6. The method, as set forth in claim 1, wherein comparing the actual bid comprises:
comparing the actual bid to a predetermined percentage of the current winning bid;
comparing the actual bid to a predetermined percentage of a target price; and
disallowing the entry of the actual bid in response to the actual bid being less than the predetermined percentage of the current winning bid, or the actual bid being less than the predetermined percentage of the target price.

7. The method, as set forth in claim 1, wherein comparing the actual bid comprises:
comparing the actual bid with a minimum bid of the current winner;
setting the actual bid as the current winning bid in response to the actual bid being less than the minimum bid of the current winner.

8. The method, as set forth in claim 1, wherein comparing the actual bid comprises:
comparing the actual bid with a minimum bid of the current winner;
setting the actual bid minus a predetermined delta value as the current winning bid in response to the actual bid being greater than the minimum bid of the current winner; and
setting the supplier who submitted the actual bid as the current winner.

9. The method, as set forth in claim 1, wherein comparing the actual bid comprises:
comparing the actual bid with a minimum bid of the current winner;
setting the minimum bid of the current winner as the current winning bid in response to the actual bid being equal to the minimum bid of the current winner.

10. The method, as set forth in claim 1, wherein comparing the actual bid and the minimum bid comprise:
comparing the actual bid with a minimum bid of the current winner;
comparing the minimum bid of the current winner to the minimum bid; and
setting the minimum bid of the current winner minus a predetermined delta value as the current winning bid in response to the actual bid being greater than the minimum bid of the current winner, and the minimum bid minus the predetermined delta value being greater than the minimum bid of the current winner.

11. The method, as set forth in claim 1, wherein comparing the actual bid and the minimum bid comprise:
comparing the actual bid with a minimum bid of the current winner;
comparing the minimum bid of the current winner to the minimum bid; and
setting the minimum bid of the current winner as the current winning bid in response to the actual bid being greater than the minimum bid of the current winner, and the minimum bid being equal to the minimum bid of the current winner.

12. The method, as set forth in claim 1, wherein comparing the actual bid and the minimum bid comprise:
comparing the actual bid with a minimum bid of the current winner;
comparing the minimum bid of the current winner to the minimum bid; and
setting the minimum bid of the current winner minus a predetermined delta value as the current winning bid in response to the actual bid being greater than the minimum bid of the current winner, the minimum bid of the current winner being greater than the minimum bid, and the minimum bid of the current winner minus the predetermined delta value being greater than or equal to the minimum bid; and setting the minimum bid as the current winning bid in response to the actual bid being greater than the minimum bid of the current winner, the minimum bid of the current winner being greater than the minimum bid, and the minimum bid of the current winner minus the predetermined delta value being less than the minimum bid.

13. The method, as set forth in claim 1, wherein comparing the actual bid comprises:
    comparing the actual bid with an actual bid of the current winner;
    setting the supplier submitting the actual bid as the current winner in response to the actual bid being less than the actual bid of the current winner; and
    setting the actual bid as the current winning bid in response to the actual bid being less than the actual bid of the current winner.

14. The method, as set forth in claim 1, wherein comparing the minimum bid comprises:
    comparing the current winning bid minus a predetermined delta value with the minimum bid;
    setting the supplier submitting the minimum bid as the current winner in response to the current winning bid minus a predetermined delta value being greater than or equal to the minimum bid;
    setting the current winning bid minus the predetermined delta value as the current winning bid in response to the current winning bid minus a predetermined delta value being greater than or equal to the minimum bid; and
    setting the minimum bid as the current winning bid in response to the current winning bid minus a predetermined delta value being less than the minimum bid.

15. The method, as set forth in claim 1, wherein storing event data comprises:
    assigning and storing an event identifier into an event table;
    storing the event token into the event table;
    storing a start date for the event into the event table;
    storing an end date for the event into the event table; and
    storing an end date for overtime for the event into the event table.

16. The method, as set forth in claim 1, wherein storing commodity data comprises:
    storing a lot identifier for the at least one commodity into a lot table;
    storing an item identifier for at least one item in the lot into the lot table;
    storing an event identifier of the event into the lot table;
    storing a quantity for each item in the lot into the lot table;
    storing a starting bid amount for each lot into the lot table; and
    storing a target price for each lot into the lot table.

17. The method, as set forth in claim 16, further comprising:
    storing a current winning bid for the lot into the lot table; and
    storing a minimum bid of the supplier who submitted the current winning bid.

18. The method, as set forth in claim 1, further comprising:
    assigning and storing a bid sequence number for a bid submitted for a lot in the event into a bid table;
    storing a lot identifier for the submitted bid into the bid table;
    storing a supplier identified of the supplier who submitted the bid into the bid table;
    storing a user identifier of the agent who submitted the bid into the bid table;
    storing the submitted actual bid into the bid table, if applicable;
    storing the submitted minimum bid into the bid table, if applicable;
    setting a flag indicative of a manual submission of the actual bid or an actual bid automatically submitted based on the minimum bid into the bid table; and
    storing a date and time of bid submission into the bid table.

19. The method, as set forth in claim 1, wherein storing supplier data and historical data comprise:
    storing a supplier identifier of a supplier into a supplier event table;
    storing an event identifier into the supplier event table; and
    storing a historical dollar amount representing past business of the supplier for the at least one commodity in the event in the supplier event table.

20. The method, as set forth in claim 1, wherein storing historical data comprises:
    storing a supplier identifier of a supplier into a supplier history table;
    storing an item identifier of the at least one commodity into the supplier history table;
    storing an old part number of an old item comparable to the at least one commodity into the supplier history table, the old item being previously supplied by the supplier;
    storing an old price of the old item into the supplier history table;
    storing an old quantity of the old item the supplier previously supplied into the supplier history table.

21. The method, as set forth in claim 1, further comprising:
    computing a total price representative of the winning bid for the at least one commodity;
    comparing the total price for the at least one commodity with a historical total for the at least one commodity; and
    computing a difference between the total price and the historical total.

22. The method, as set forth in claim 1, wherein color coding the at least one entry comprises:
    showing an entry of a commodity where a bid submitted by the agent in green if it is the current winning bid;
    showing an entry of a commodity where a bid submitted by the agent in red if it is not the current winning bid; and
    showing an entry of a commodity where a bid has not been submitted by the agent in a neutral color.

23. The method, as set forth in claim 1, further comprising:
    coupling a web server having access to the at least one data tables and a bid entry web page for displaying the bid entry screen with a user terminal via the Internet; and
    transmitting the web page and data between the web server and the user terminal via the Internet.

24. A method of conducting an online competitive price quoting event for at least one commodity, comprising:
    storing event data associated with the event into at least one data table;
    storing commodity data associated with the at least one commodity into the at least one data table;
    storing supplier data associated with a plurality of suppliers who will participate in the event into the at least one data table;
    storing historical data associated with past transactions related to the at least one commodity of the plurality of suppliers;
    storing a default currency for the event into the at least one data table;
    storing a preferred currency for each of the plurality of suppliers into the at least one data table;
    providing an event token to the suppliers;

granting access authorization to agents representing the plurality of suppliers in response to receiving the event token for the event;

transmitting a bid entry web page to the agents over the Internet, the bid entry web page listing the at least one commodity as at least one entry, a current winning bid in the preferred currencies of the suppliers, a target price in the preferred currencies of the suppliers, status of the agents' bids, and entry fields for receiving an actual bid and a minimum bid;

comparing the actual bid to the current winning bid and a current minimum bid in response to receiving the actual bid from an agent and transmitted over the Internet, the actual bid representing the price at which the supplier is willing to sell the at least one commodity;

comparing the minimum bid to the current winning bid and the current minimum bid in response to receiving the minimum bid from the agent, the minimum bid representing the lowest price the supplier is willing to sell the at least one commodity;

determining a new current winning bid based at least in part on the comparisons of the actual bid and the minimum bid to the current winning bid and the current minimum bid;

computing a total price representative of the winning bid for the at least one commodity;

comparing the total price for the at least one commodity with a historical total for a commodity comparable to the at least one commodity that the supplier of the winning bid supplied in one or more previous events; and computing a difference between the total price and the historical total.

25. The method, as set forth in claim 24, further comprising:
updating the bid entry web page with the current winning bid; and
color coding the at least one entry on the bid entry screen to reflect the current status of the agent's bids.

26. The method, as set forth in claim 24, further comprising generating a bid summary of a supplier including a part number of the at least one commodity, a lot number, a quantity, the target price, the actual bid submitted, the minimum bid submitted, a confirmation identifier, and a confirmation time.

27. The method, as set forth in claim 24, further comprising:
granting access authorization to an event administrator in response to receiving the event token for the event;
generating a savings summary of the event including names of suppliers who has a winning bid for a commodity, a historical value for each supplier representing past sales figures for the commodity, a bid value representing the sales figure for the commodity in the current event, and a change value representing the difference between the historical value and the bid value.

28. The method, as set forth in claim 24, further comprising:
granting access authorization to an event administrator in response to receiving the event token for the event;
generating a savings summary of the event including:
names of suppliers who have a winning bid for the at least one commodity;
a historical value for each supplier representing past sales figures for the commodity;
a bid value representing the sales figure for the commodity in the current event;
an adjusted baseline value representing the historical value being adjusted for parts that the suppliers are not invited to bid, new parts without historical value, and parts with historical value that the suppliers have not bid on; and
a change value representing the difference between the historical value and the bid value.

29. The method, as set forth in claim 24, further comprising:
granting access authorization to an event administrator in response to receiving the event token for the event;
generating a detailed event summary of the event, wherein each entry includes:
a bid identifier;
a part number of the at least one commodity;
a quantity;
a supplier identifier of the supplier with the winning bid;
an actual bid;
a minimum bid indicator if a minimum bid was submitted;
a timestamp of the bid; and
a user identifier of the agent who submitted the winning bid.

30. The method, as set forth in claim 24, wherein comparing the actual bid comprises:
comparing the actual bid to a predetermined percentage of the current winning bid;
comparing the actual bid to a predetermined percentage of a target price; and
disallowing the entry of the actual bid in response to the actual bid being less than the predetermined percentage of the current winning bid, or the actual bid being less than the predetermined percentage of the target price.

31. The method, as set forth in claim 24, wherein comparing the actual bid comprises:
comparing the actual bid with a minimum bid of the current winner;
setting the actual bid as the current winning bid in response to the actual bid being less than the minimum bid of the current winner.

32. The method, as set forth in claim 24, wherein comparing the actual bid comprises:
comparing the actual bid with a minimum bid of the current winner;
setting the actual bid minus a predetermined delta value as the current winning bid in response to the actual bid being greater than the minimum bid of the current winner; and
setting the supplier who submitted the actual bid as the current winner.

33. The method, as set forth in claim 24, wherein comparing the actual bid comprises:
comparing the actual bid with a minimum bid of the current winner;
setting the minimum bid of the current winner as the current winning bid in response to the actual bid being equal to the minimum bid of the current winner.

34. The method, as set forth in claim 24, wherein comparing the actual bid and the minimum bid comprise:
comparing the actual bid with a minimum bid of the current winner;
comparing the minimum bid of the current winner to the minimum bid; and
setting the minimum bid of the current winner minus a predetermined delta value as the current winning bid in response to the actual bid being greater than the minimum bid of the current winner, and the minimum bid minus the predetermined delta value being greater than the minimum bid of the current winner.

35. The method, as set forth in claim 24, wherein comparing the actual bid and the minimum bid comprise:
- comparing the actual bid with a minimum bid of the current winner;
- comparing the minimum bid of the current winner to the minimum bid; and
- setting the minimum bid of the current winner as the current winning bid in response to the actual bid being greater than the minimum bid of the current winner, and the minimum bid being equal to the minimum bid of the current winner.

36. The method, as set forth in claim 24, wherein comparing the actual bid and the minimum bid comprise:
- comparing the actual bid with a minimum bid of the current winner;
- comparing the minimum bid of the current winner to the minimum bid; and
- setting the minimum bid of the current winner minus a predetermined delta value as the current winning bid in response to the actual bid being greater than the minimum bid of the current winner, the minimum bid of the current winner being greater than the minimum bid, and the minimum bid of the current winner minus the predetermined delta value being greater than or equal to the minimum bid; and
- setting the minimum bid as the current winning bid in response to the actual bid being greater than the minimum bid of the current winner, the minimum bid of the current winner being greater than the minimum bid, and the minimum bid of the current winner minus the predetermined delta value being less than the minimum bid.

37. The method, as set forth in claim 24, wherein comparing the actual bid comprises:
- comparing the actual bid with an actual bid of the current winner;
- setting the supplier submitting the actual bid as the current winner in response to the actual bid being less than the actual bid of the current winner; and
- setting the actual bid as the current winning bid in response to the actual bid being less than the actual bid of the current winner.

38. The method, as set forth in claim 24, wherein comparing the minimum bid comprises:
- comparing the current winning bid minus a predetermined delta value with the minimum bid;
- setting the supplier submitting the minimum bid as the current winner in response to the current winning bid minus a predetermined delta value being greater than or equal to the minimum bid;
- setting the current winning bid minus the predetermined delta value as the current winning bid in response to the current winning bid minus a predetermined delta value being greater than or equal to the minimum bid; and
- setting the minimum bid as the current winning bid in response to the current winning bid minus a predetermined delta value being less than the minimum bid.

39. The method, as set forth in claim 24, wherein storing event data comprises:
- assigning and storing an event identifier into an event table;
- storing the event token into the event table;
- storing a start date for the event into the event table;
- storing an end date for the event into the event table; and
- storing an end date for overtime for the event into the event table.

40. The method, as set forth in claim 24, wherein storing commodity data comprises:
- storing a lot identifier for the at least one commodity into a lot table;
- storing an item identifier for at least one item in the lot into the lot table;
- storing an event identifier of the event into the lot table;
- storing a quantity for each item in the lot into the lot table;
- storing a starting bid amount for each lot into the lot table; and
- storing a target price for each lot into the lot table.

41. The method, as set forth in claim 40, further comprising:
- storing a current winning bid for the let into the lot table; and
- storing a minimum bid of the supplier who submitted the current winning bid.

42. The method, as set forth in claim 24, further comprising:
- assigning and storing a bid sequence number for a bid submitted for a lot in the event into a bid table;
- storing a lot identifier for the submitted bid into the bid table;
- storing a supplier identifier of the supplier who submitted the bid into the bid table;
- storing a user identifier of the agent who submitted the bid into the bid table;
- storing the submitted actual bid into the bid table, if applicable;
- storing the submitted minimum bid into the bid table, if applicable;
- setting a flag indicative of a manual submission of the actual bid or an actual bid automatically submitted based on the minimum bid into the bid table; and
- storing a date and time of bid submission into the bid table.

43. The method, as set forth in claim 24, wherein storing supplier data and historical date comprise:
- storing a supplier identifier of a supplier into a supplier event table;
- storing an event identifier into the supplier event table; and
- storing a historical dollar amount representing past business of the supplier for the at least one commodity in the event in the supplier event table.

44. The method, as set forth in claim 24, wherein storing historical data comprises:
- storing a supplier identifier of a supplier into a supplier history table;
- storing an item identifier of the at least one commodity into the supplier history table;
- storing an old part number of an old item comparable to the at least one commodity into the supplier history table, the old item being previously supplied by the supplier;
- storing an old price of the old item into the supplier history table;
- storing an old quantity of the old item the supplier previously supplied into the supplier history table.

45. The method, as set forth in claim 24, further comprising:
- computing a total price representative of the winning bid for the at least one commodity;
- comparing the total price for the at least one commodity with a historical total for the at least one commodity; and
- computing a difference between the total price and the historical total.

46. The method, as set forth in claim 45, further comprising:
- computing a total price representative of the winning bid for the at least one commodity;

comparing the total price for the at least one commodity with a historical total for a commodity comparable to the at least one commodity that the supplier of the winning bid supplied in a previous year; and computing a difference between the total price and the historical total.

47. The method, as set forth in claim 24, further comprising generating an event report containing a log of all bids placed in the event, the event report including, for each bid, a bid identifier, a part number, a lot number, a quantity, a supplier identifier, the actual bid, the minimum bid, a time and date the bid was submitted, and a user identifier of the agent of the supplier that submitted the bid.

48. The method, as set forth in claim 24, wherein color coding the at least one entry comprises:

showing an entry of a commodity where a bid submitted by the agent in green if it is the current winning bid;

showing an entry of a commodity where a bid submitted by the agent in red if it is not the current winning bid; and showing an entry of a commodity where a bid has not been submitted by the agent in a neutral color.

* * * * *